(12) United States Patent
Gamble et al.

(10) Patent No.: US 9,764,394 B2
(45) Date of Patent: Sep. 19, 2017

(54) ROTARY CUTTING TOOL WITH INCREASED STIFFNESS AND METHOD OF ASSEMBLING SAME

(71) Applicant: Kennametal Inc., Latrobe, PA (US)

(72) Inventors: Kevin Michael Gamble, Stahlstown, PA (US); Ronald Louis Dudzinsky, Derry, PA (US); James Michael Waggle, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 263 days.

(21) Appl. No.: 14/246,919

(22) Filed: Apr. 7, 2014

(65) Prior Publication Data

US 2015/0283628 A1    Oct. 8, 2015

(51) Int. Cl.
*B23C 5/00* (2006.01)
*B23C 5/10* (2006.01)

(52) U.S. Cl.
CPC .............. *B23C 5/003* (2013.01); *B23C 5/006* (2013.01); *B23C 5/109* (2013.01); *B23C 2250/12* (2013.01); *B23C 2250/16* (2013.01); *Y10T 407/14* (2015.01); *Y10T 407/1904* (2015.01)

(58) Field of Classification Search
CPC ......... B23C 5/003; B23C 5/28; B23B 29/022; B23B 27/002; B23B 2250/16; B23B 51/042; B23B 51/0486; B23B 51/06; Y10T 408/76
See application file for complete search history.

(56) References Cited

U.S. PATENT DOCUMENTS

| | | | | |
|---|---|---|---|---|
| 2,014,679 | A | * | 9/1935 | Eckreate ................... B23B 5/12 408/200 |
| 2,051,954 | A | * | 8/1936 | Leland ..................... B23B 29/02 408/143 |
| 2,960,189 | A | * | 11/1960 | Osburn .............. B23Q 17/0976 181/207 |
| 3,164,041 | A | * | 1/1965 | Carlstedt ............... B23B 29/022 408/144 |

(Continued)

FOREIGN PATENT DOCUMENTS

| | | | | |
|---|---|---|---|---|
| CN | 101890514 | A | * 6/2010 | ............. B23B 29/02 |
| CN | 201799633 | U | * 4/2011 | ............. B23B 29/03 |

(Continued)

*Primary Examiner* — Sunil K Singh
*Assistant Examiner* — Donte Brown
(74) *Attorney, Agent, or Firm* — Ian K. Samways (57) ABSTRACT

A rotary cutting tool includes a cutter body having a head, a shank, and a cavity extending along a central, longitudinal axis of the cutter body. The head includes at least one cutting insert mounted in a pocket adjacent to a chip groove. A stiffening device includes a plurality of slugs with high compressive strength disposed within the cavity, and a first compression screw threaded into a rearward end of the cutting tool. In another embodiment, a second compression screw is threaded into a forward end of the cutter body. In another embodiment, each slug includes a coolant hole, circumferential grooves and axial grooves on its outer diameter, and a plurality of radial grooves on each end, and the first compression screw has a coolant hole for allowing coolant to pass therethrough.

20 Claims, 7 Drawing Sheets

(56) References Cited

U.S. PATENT DOCUMENTS

| | | | | |
|---|---|---|---|---|
| 3,207,009 A * | 9/1965 | Carlstedt | ............... | B23B 29/022<br>188/380 |
| 3,207,014 A * | 9/1965 | Carlstedt | ................ | B23Q 1/76<br>188/381 |
| 3,230,831 A * | 1/1966 | Harker | ............... | B23Q 17/0976<br>409/141 |
| 3,559,512 A * | 2/1971 | Aggarwal | ............. | B23B 29/022<br>188/322.5 |
| 3,582,226 A * | 6/1971 | Shurtliff | ................ | B23B 29/022<br>408/143 |
| 3,598,498 A * | 8/1971 | Holmen | ................ | B23B 29/022<br>408/143 |
| 3,690,414 A * | 9/1972 | Aggarwal | .......... | B23Q 11/0032<br>188/378 |
| 3,923,414 A * | 12/1975 | Hopkins | ............... | B23B 29/022<br>188/378 |
| 3,938,626 A * | 2/1976 | Hopkins | ............... | B23B 29/022<br>188/378 |
| 4,130,185 A * | 12/1978 | Densmore | ............... | E04B 1/985<br>174/42 |
| 4,162,619 A * | 7/1979 | Nixon, Jr. | ............... | E21B 17/07<br>175/321 |
| 4,285,260 A * | 8/1981 | Salje | .................... | B23D 61/026<br>144/218 |
| 4,903,785 A * | 2/1990 | Odoni | .................... | B23B 51/00<br>173/131 |
| 5,328,308 A * | 7/1994 | Ducker, III | .......... | B23B 31/005<br>407/30 |
| 7,661,912 B2 * | 2/2010 | Onozuka | ............... | B23B 29/022<br>188/322.5 |
| 8,534,962 B2 * | 9/2013 | Sjoo | .................... | B23B 31/1107<br>407/34 |
| 8,784,016 B2 * | 7/2014 | Gamble | ................. | B23C 5/109<br>408/143 |
| 8,956,092 B2 * | 2/2015 | Lundblad | ................ | B23C 5/003<br>408/143 |
| 2002/0190449 A1 | 12/2002 | Takahashi et al. | | |
| 2006/0275090 A1 | 12/2006 | Onozuka et al. | | |
| 2008/0298913 A1 | 12/2008 | Young et al. | | |
| 2010/0096228 A1 | 4/2010 | Digernes et al. | | |
| 2011/0229278 A1 * | 9/2011 | Sjoo | ........................ | B23C 5/003<br>407/40 |
| 2011/0318127 A1 | 12/2011 | Freyermuth et al. | | |
| 2011/0318130 A1 | 12/2011 | Freyermuth et al. | | |
| 2013/0004250 A1 * | 1/2013 | Gamble | ................. | B23C 5/109<br>407/40 |

FOREIGN PATENT DOCUMENTS

| | | | | |
|---|---|---|---|---|
| DE | 3541322 A1 * | 7/1986 | ........... | B23B 29/022 |
| DE | WO 2005063437 A1 * | 7/2005 | ................ | B23Q 1/34 |
| EP | 000186067 A2 * | 4/1986 | ............ | B23B 27/10 |
| GB | 1320531 A * | 6/1973 | ........... | B23B 29/022 |
| JP | 59129608 A2 | 7/1984 | | |
| JP | 03086404 A * | 4/1991 | ............. | B23B 29/02 |
| JP | 7227711 A2 | 8/1995 | | |
| JP | 2001-328022 A2 | 11/2001 | | |
| JP | 2001328022 A * | 11/2001 | ............... | B23C 9/00 |
| JP | 2004358613 A * | 12/2004 | ............. | B23B 29/02 |
| JP | 2005329509 A * | 12/2005 | ............. | B23B 29/02 |
| JP | 2011011276 A * | 1/2011 | ............. | B23B 29/02 |
| JP | 2015110257 A * | 6/2015 | ............. | B23B 29/02 |
| KR | 2010057138 A * | 5/2010 | ............. | B23C 5/02 |
| SU | 655478 A * | 4/1979 | ............. | B23B 29/02 |
| SU | 665994 A * | 6/1979 | ............. | B23B 29/034 |
| SU | 1360911 A * | 12/1987 | ............. | B23B 29/02 |
| SU | 1690957 A1 * | 11/1991 | ............. | B23B 29/02 |
| SU | 1763747 A1 * | 9/1992 | ................ | F16F 7/00 |
| WO | 02/20202 A1 | 4/2001 | | |

* cited by examiner

ROTARY CUTTING TOOL WITH INCREASED STIFFNESS AND METHOD OF ASSEMBLING SAME

BACKGROUND OF THE INVENTION of the Invention

The invention pertains to the field of cutting tools. More particularly, the invention pertains to an end mill with a plurality of tungsten carbide slugs inserted inside the end mill and one or more compression screws for compressing the slugs, thereby increasing the stiffness and rigidity of the end mill.

Description of Related Art

In general, rotary cutting tools are designed with multiple flutes spaced approximately symmetrical around the circumference of the tool where the flutes run along a partial length of the tool ending at the tool shank. The tool shank is the portion of the tool that is mounted in a machine tool and the fluted portion is the portion of the tool that engages the workpiece. The total number of flutes may vary, and the flutes may be formed to extend either parallel to the longitudinal rotational axis of the tool or more commonly to extend about the rotational axis as a helix. In a helical arrangement, the cutting edges defined by the flutes are each described by a "helix angle," which is the angle formed by a line tangent to the helix and a line parallel to the rotational axis of the tool.

Conventional rotary cutting tools perform adequately at conventional speeds (RPM) and feeds, however, at speeds and feeds higher than conventional, which is desirable for productivity, considerable performance decay is experienced. This performance decay is directly attributable to the presence and magnitude of vibration, specifically resonant vibration, as cutting force increases. At increased speeds and/or feeds, conventional helical and straight-fluted tools induce resonance, whereby the action of the tool cutting a workpiece has a tendency to enhance potential oscillatory energy when the frequency of the oscillations matches the system's natural frequency of vibration (its resonant frequency) or a harmonic thereof. The occurrence of uncontrolled resonant vibration inevitably results in a condition commonly referred to as "chatter," which results in poor tool performance both in terms of life expectancy and workpiece quality. This is an undesirable occurrence.

Several approaches to solving the problem of chatter attempt to minimize the occurrence and resultant effect of resonant frequency vibration by increasing the stiffness of the cutting tool. For example, a single cemented tungsten carbide rod may be used to add stiffness to a rotary cutting tool. Unfortunately, the tungsten carbide rod is susceptible to cracking when subjected to side impact loads.

SUMMARY OF THE INVENTION

The problem of increasing stiffness of a rotary cutting tool, while preventing cracking of a tungsten carbide stiffening rod, is solved by inserting a plurality of slugs inside a cavity of the rotary cutting tool and threading one or more compression screws into an end of the cutting tool to compress the plurality of slugs into a tightened arrangement, thereby tensioning the cutter body of the rotary cutting tool and increasing the stiffness of the rotary cutting tool.

In one aspect of the invention, a rotary cutting tool comprises a cutter body having a forward end and a rearward end. The cutter body includes a head, a shank, and a cavity extending from the rearward end toward the forward end along a central, longitudinal axis of the cutter body. The cavity has threads at one end thereof. The head further includes at least one cutting insert mounted in a pocket along at least one chip groove. The rotary cutting tool further includes a stiffening device including a first compression screw threaded into the rearward end and a plurality of cylindrical slugs with high compressive strength disposed within the cavity. The stiffening device increases the stiffness of the cutting tool when the first compression screw is threaded into the rearward end of the cutting tool.

In another aspect of the invention, a rotary cutting tool comprises a cutter body having a forward end, a rearward end. The cutter body includes a head, a shank, and a cavity extending from the rearward end toward the forward end along a central, longitudinal axis of the cutter body. The cavity has threads at both ends thereof. The head further includes at least one cutting insert mounted in a pocket along at least one chip groove. The rotary cutting tool further includes a stiffening device including a first compression screw threaded into the rearward end, a second compression screw threaded into the forward end, and a plurality of cylindrical slugs with high compressive strength disposed within the cavity. The stiffening device increases the stiffness of the cutting tool when the first compression screw is threaded into the rearward end of the cutting tool and the second compression screw is threaded into the forward end of the cutting tool.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Below are illustrations and explanations for a version of a helical end mill and a cutting insert therefor. However, it is noted that the helical end mill and cutting insert may be configured to suit the specific application and is not limited only to the example in the illustrations.

Figure 1:
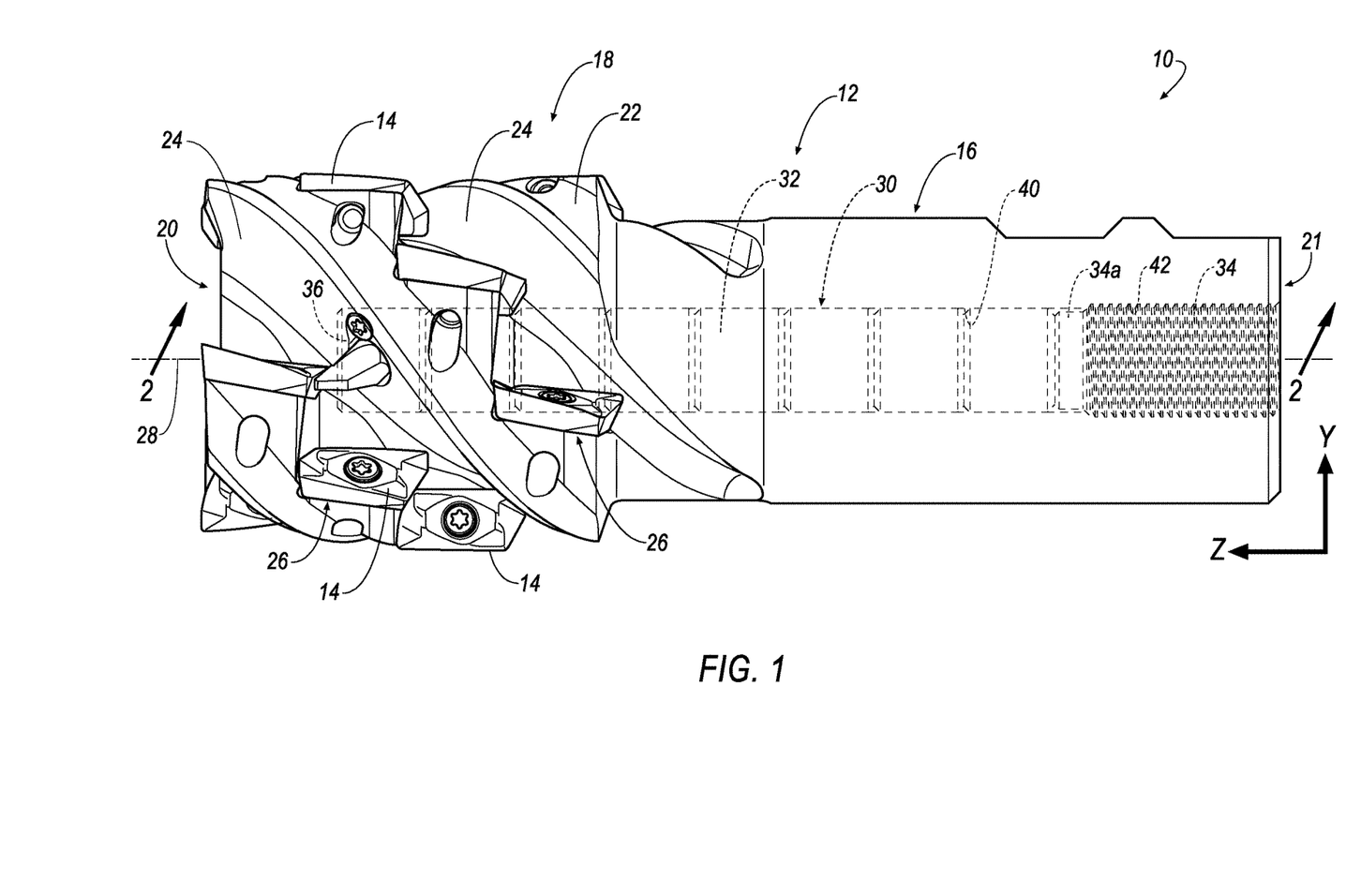
FIG. 1 is a side phantom view of a rotary cutting tool with a stiffening device with a plurality of slugs and a compression screw according to an exemplary embodiment of the invention.
Figure 2:
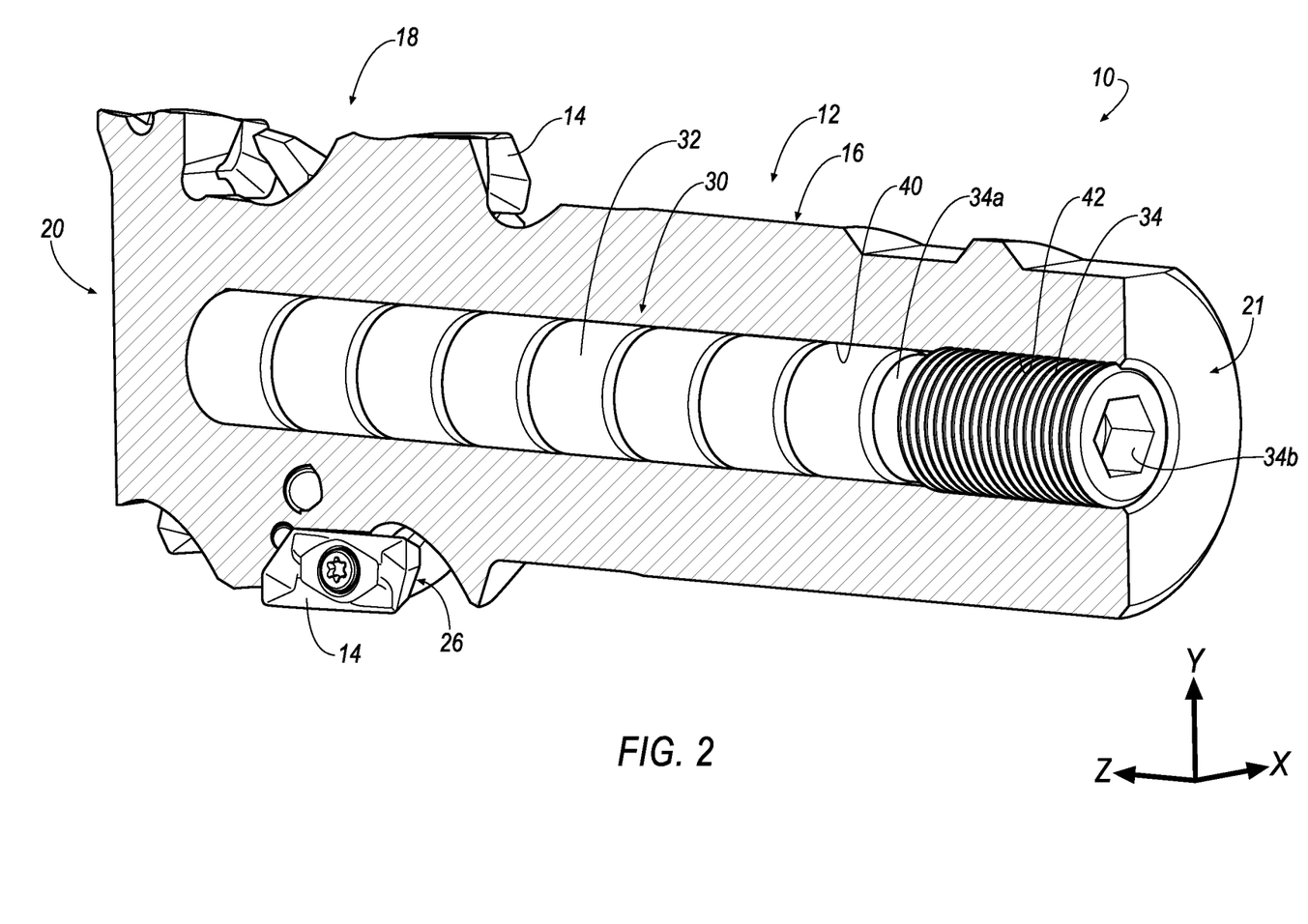
FIG. 2 is an isometric cutaway phantom view of the rotary cutting tool of FIG. 1.

Referring now to FIGS. 1 and 2, a rotary cutting tool, shown generally at 10, includes a cutter body 12 that is embodied as a helical end mill with a plurality of indexable cutting inserts 14 for ramping, circle interpolating, facing and end milling. Although the cutting inserts 14 are shown in a helical end mill embodiment, the cutting inserts 14 are designed for use in any type of milling, such as shell end milling, face milling, fly cutting, and the like.

The cutter body 12 is of an elongated and generally cylindrical shape. The cutter body 12 comprises a shank 16 and a head 18. The shank 16 is configured so as to be capable of insertion and securing within the spindle of a milling machine (not shown) as is well known in the art. The shank 16 may be of any shape or design so as to be capable of this insertion and securing. Such designs include, but are not limited to, V-flange, taper, shell mill mount, and Weldon shank.

The head 18 is a generally cylindrical body that extends axially from the shank 16 to a forward end 20, thereby defining an exterior surface 22 therebetween. The exterior surface 22 of the head 18 preferably includes a plurality of helical chip grooves or flutes 24 formed therein. It will be appreciated that the invention is not limited by the number of helical chip grooves 24. In the illustrated embodiment, two grooves out of a total of three grooves are shown in FIG. 1, although any number of helical grooves are contemplated by the invention. Each chip groove 24 is preferably cut into the exterior surface 22 in a helical or spiral manner that extends from the forward end 20 to substantially the shank 16. A plurality of pockets 26 are disposed adjacent each helical chip groove 24. Each pocket 26 is capable of receiving a respective cutting insert 14 mounted thereon. The cutting tool 10 has a central, longitudinal axis 28 (in the direction of the z-axis).

One aspect of the invention is that the cutting tool 10 includes a stiffening device, shown generally at 30, for increasing stiffness of the cutting tool 10. As used herein, the stiffness of the cutting tool is the rigidity of the cutting tool 10 and is defined as the resistance to the cutting tool 10 to deformation in response to an applied force. The complementary concept to stiffness is flexibility or pliability: the more pliable the cutting tool 10, the less stiff it is. The stiffness, k, of a body is a measure of the resistance offered by an elastic body to deformation. For an elastic body with a single degree of freedom, for example, stretching or compression of a rod, the stiffness is defined as:

$$k=F/\delta \quad \text{(Eq. 1)}$$

where,

F is the force applied on the body, and

δ is the displacement produced by the force along the same degree of freedom (for example, the change in length of a stretched spring).

A body may also have a rotational stiffness, k, given by:

$$k=M/\theta \quad \text{(Eq. 2)}$$

where,

M is the applied moment, and

θ is the rotation.

The stiffening device 30 is disposed within a cylindrical-shaped cavity 40 that extends from a rearward end 21 of the cutter body 12. The stiffening device 30 includes a plurality of cylindrical slugs 32 and at least one compression screw 34. In the illustrated embodiment, a single compression screw 34 is threaded into the rearward end 21 of the cutter body 12. One end 34a of the compression screw 34 may be non-threaded and cylindrical-shaped so as to have approximately the same diameter as the cylindrical slugs 32 (i.e., slightly smaller than the inner diameter of the cavity 40). The opposite end 34b of the compression screw 34 may have a hexagonal-shaped recess 34b for receiving a tool (not shown), such as an Allen wrench, and the like.

In the illustrated embodiment, the cavity 40 extends entirely through the shaft 16 and partially into the head 18 of the cutter body 12 along the central, longitudinal axis of the cutter body 12. One end of the cavity 40 has threads 42 (FIG. 4) for threadingly receiving the compression screw 34 of the stiffening device 30.

In the illustrated embodiment, the slugs 32 are solid with an outside diameter that is slightly smaller in diameter than the inside diameter of the cavity 40 such that the slugs 32 can be slip-fitted into the cavity 40. The cylindrical slugs 32 are made of a suitable material, for example, tungsten carbide, and the like, that has a high compressive strength. Tungsten carbide is approximately two times stiffer than steel, with a Young's modulus of approximately 550 GPa, and is much denser than steel or titanium. It should be appreciated that the invention is not limited by the shape of the slugs 32, and that the invention can be practiced with any desirable shape, such as square, rectangular, and the like, so long as the shape of the slugs 32 is complementary to the shape of the cavity 40.

Because the composition of the cylindrical slugs 32 is quite hard and the cutter body 12 is made of hard material, lateral movement of the cylindrical slugs 32 in the cavity 40 will transmit shocks to the cavity 40. To prevent such lateral movement, one end of the stack of cylindrical slugs 32 engage an end wall 36 of the cavity 40 and the other end of the cylindrical slugs 32 engage the compression screw 34, as shown in FIG. 1. When the compression screw 34 is threaded into the cavity 40, the slugs 32 are compressed within the cavity 40 and are held in a highly tightened arrangement, resulting in an increase in the tension and stiffness of the cutting tool 10. In addition, the additional mass of the slugs 32 will change the fundamental vibrating frequency of the cutting tool 10.

Figure 3:
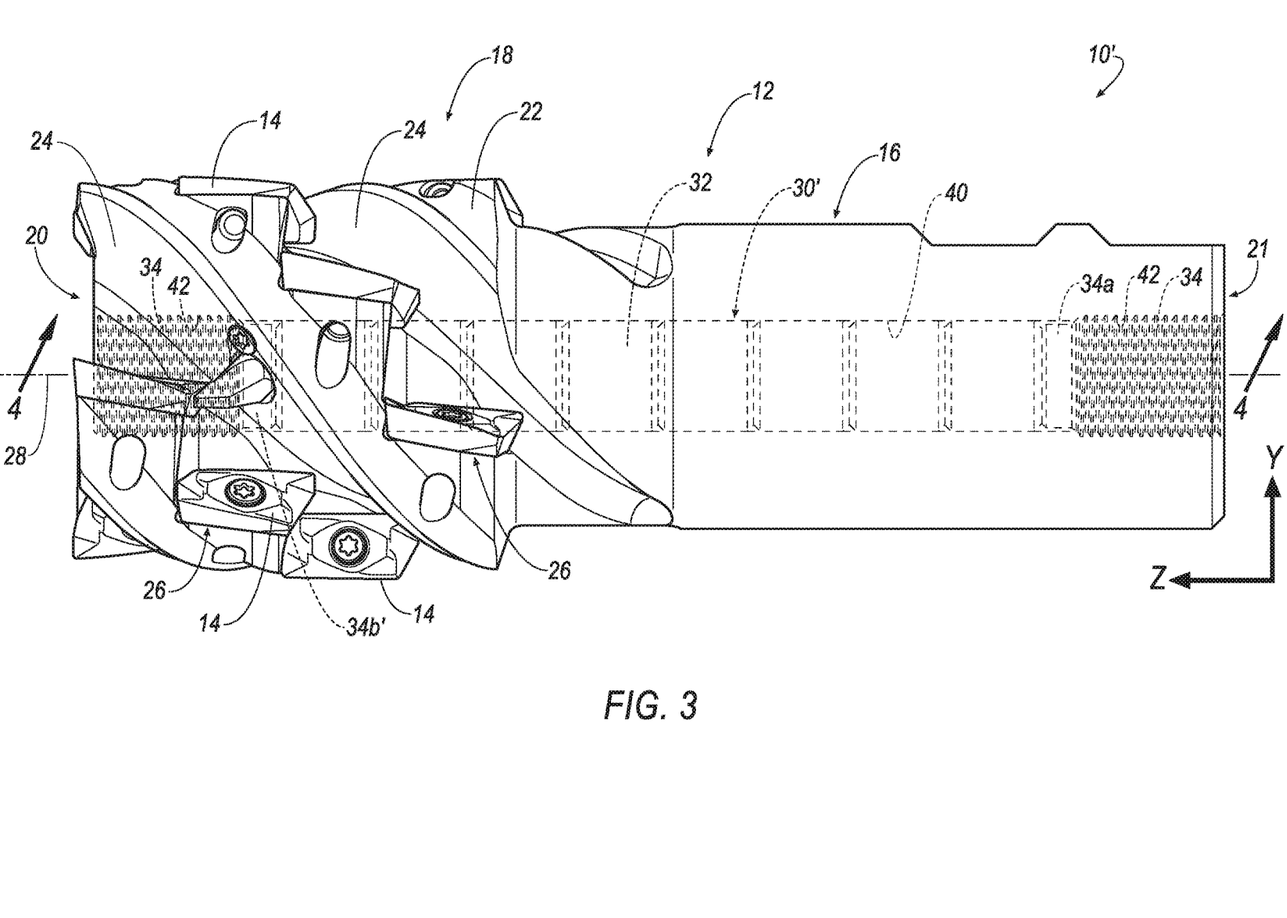
FIG. 3 is a side phantom view of a rotary cutting tool with a stiffening device having a second compression screw according to another exemplary embodiment of the invention.
Figure 4:
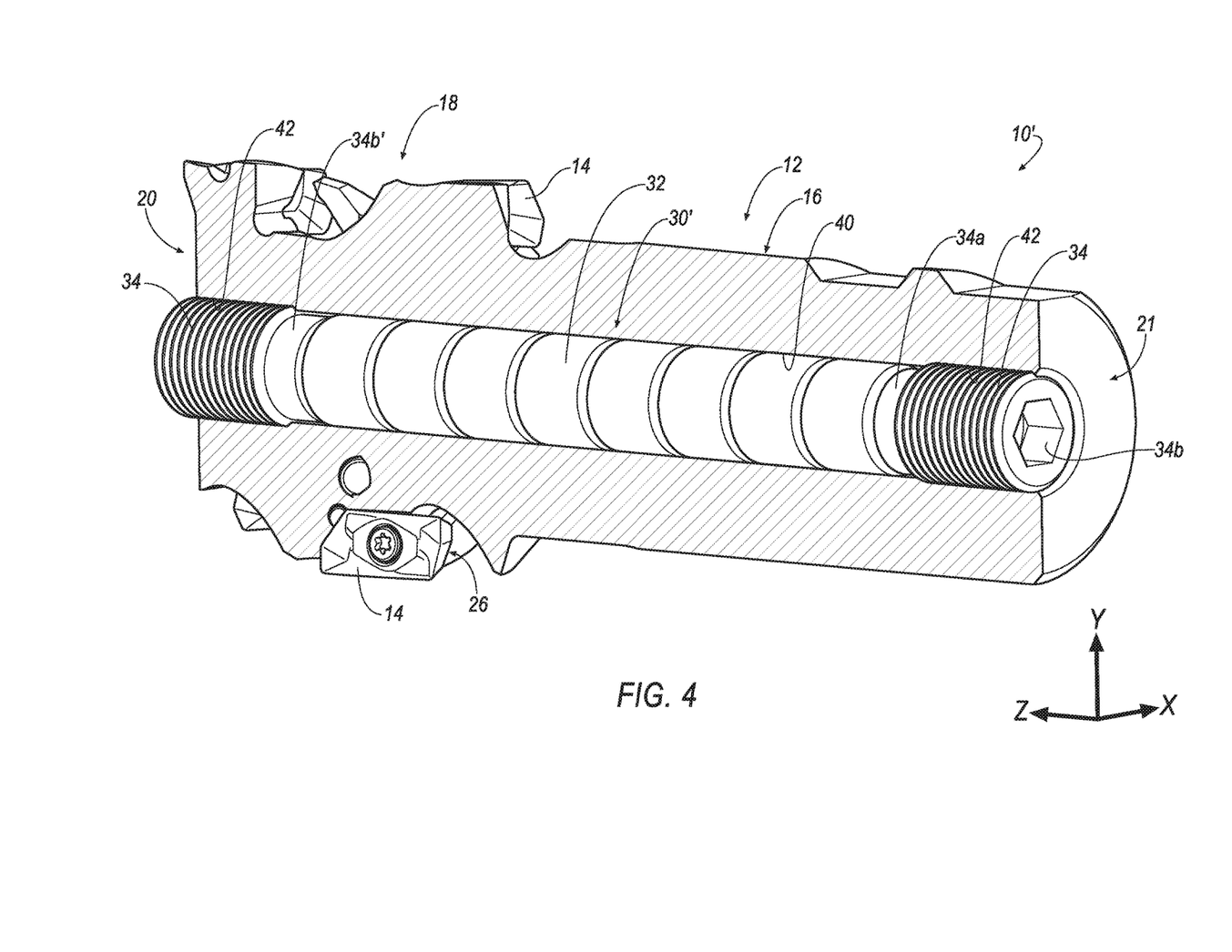
FIG. 4 is an isometric cutaway phantom view of the rotary cutting tool of FIG. 3.

Referring now to FIGS. 3 and 4, a cutting tool 10' is shown according to another embodiment of the invention. In this embodiment, the cutting tool 10' is substantially identical to the cutting tool 10, except a second compression screw 34 is provided at an opposite end of the cavity 40. In one embodiment, the second compression screw 34 is identical to the compression screw 34. In this embodiment, the cavity 40 extends entirely through from the forward end 20 to the rearward end 21 of the cutting tool 10. Both ends of the cavity 40 has threads 42 so that the second compression screw 34 can be threaded into the forward end 20 of the cutting tool 10 in a similar manner as the compression screw 34. The addition of the second compression screw 34 further increases the compression of the stack of slugs 32, thereby further increasing the tension and stiffness of the cutting tool 10'.

Referring now to FIGS. 5-8, a cutting tool 10" is shown according to another embodiment of the invention. In this embodiment, the cutting tool 10" is substantially identical to the cutting tool 10, except the cutting tool 10" has a plurality of grooved slugs 32' and a compression screw 34'.

Figure 5:
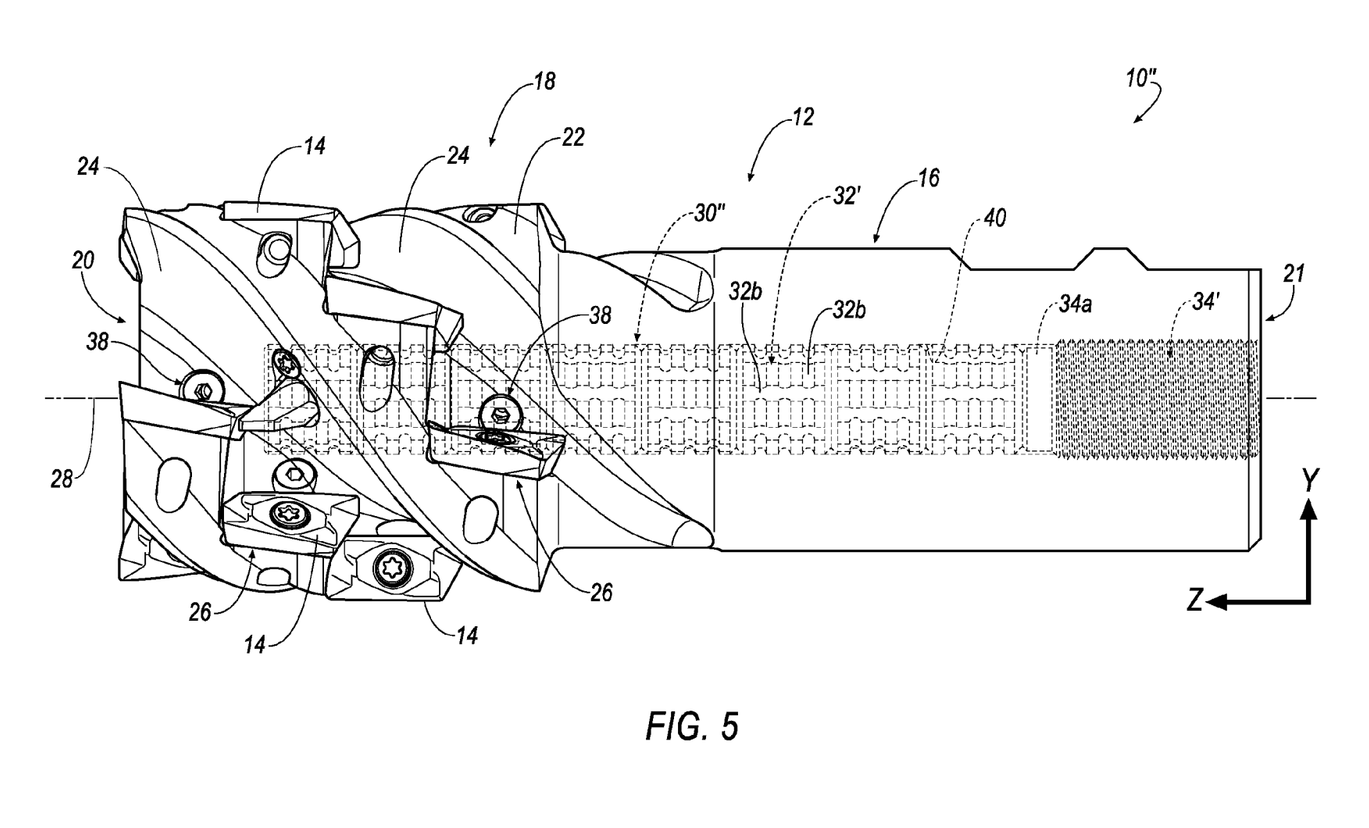
FIG. 5 is a side phantom view of a rotary cutting tool with a stiffening device with grooved slugs with a coolant hole and a compression screw with a coolant hole according to another exemplary embodiment of the invention.
Figure 6:
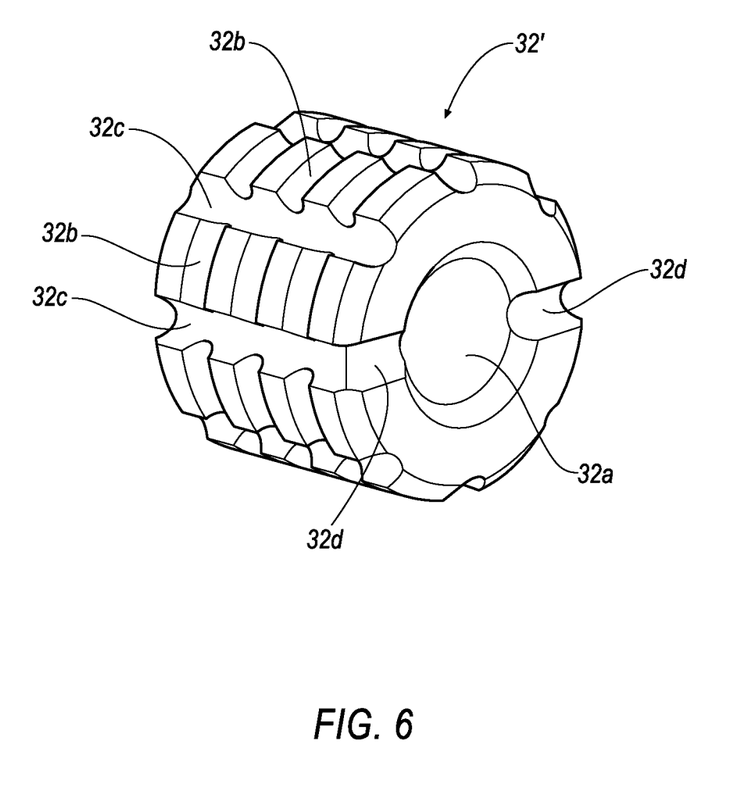
FIG. 6 is an isometric view of a grooved slug according to an embodiment of the invention.

As shown in FIG. 6, each grooved slug 32' has a coolant hole 32a longitudinally extending through the slug 32', a plurality of circumferential grooves 32b on its outer diameter, a plurality of axial grooves 32c on its outer diameter, and a plurality of radial grooves 32d on each end (only one end is shown in FIG. 6). The purpose of the coolant hole 32a and the grooves 32b, 32c, 32d is to allow coolant to flow through and around the slug 32' within the cavity 40 and to exit through a nozzle 38 (FIG. 5) proximately located each pocket 26 of the cutting tool 10.

Figure 7:
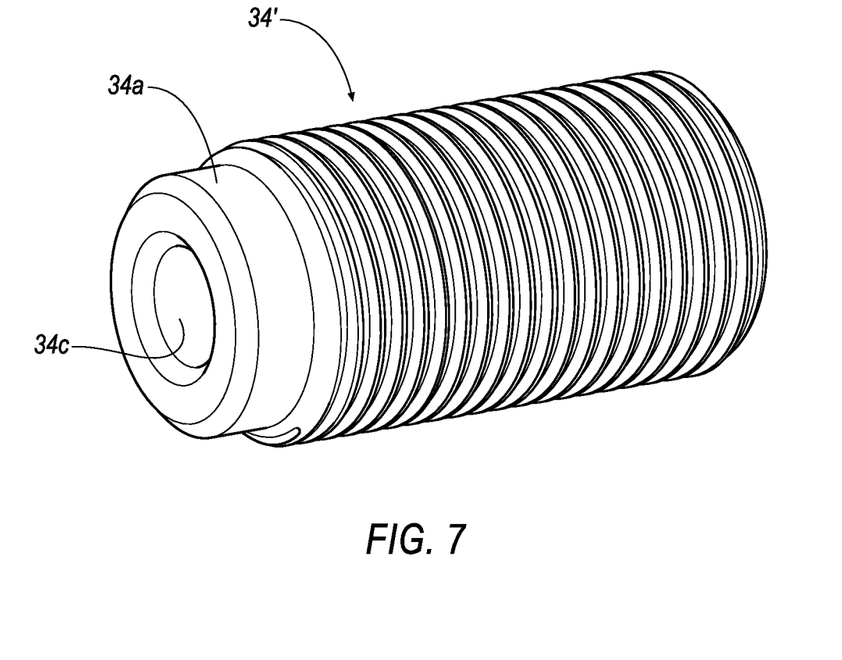
FIG. 7 is an isometric view of a compression screw with a hole to allow coolant to flow therethrough according to an embodiment of the invention.
Figure 8:
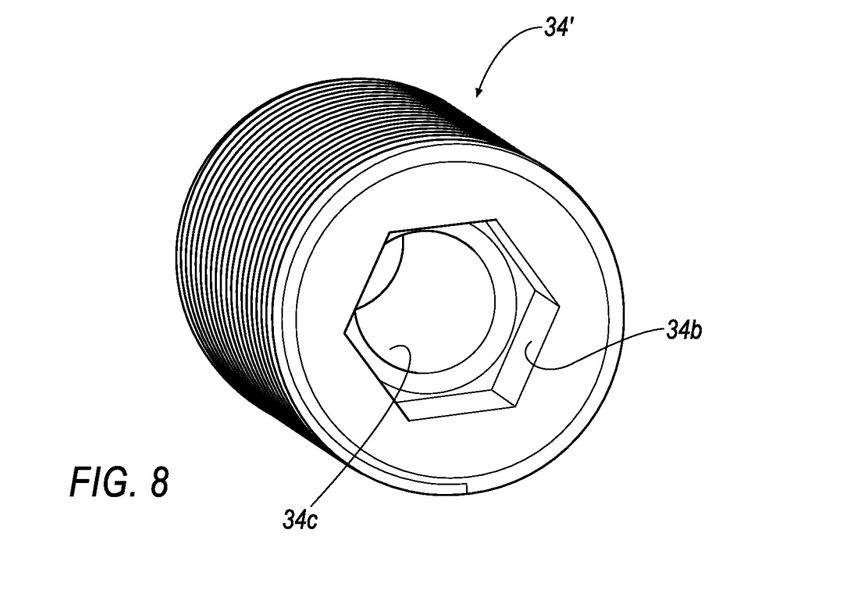
FIG. 8 is another isometric view of the compression screw of FIG. 7.

As shown in FIGS. 7 and 8, the compression screw 34' is substantially identical to the compression screw 34, except the compression screw 34' has a coolant hole 34c longitudinally extending through the compression screw 34' to allow coolant to flow therethrough.

Although the embodiment shown in FIG. 5 has only a single compression screw 34', it will be appreciated that the embodiment shown in FIG. 5 can also include the second compression screw 34 threaded into the head 18 of the cutting tool 10", as shown in FIG. 3.

To assemble the stiffening device 30 shown in FIGS. 1 and 2, the plurality of slugs 32 are slip fit into the cavity 40. Then, the compression screw 34 is threaded into the rearward end 21 of the cutting tool 10 to compress the slugs 32, thereby increasing the stiffness of the cutting tool 10.

To assemble the stiffening device 30 shown in FIGS. 3 and 4, the second compression screw 34 is threaded into the forward end 20 of the cutting tool 10. Then, the plurality of slugs 32 are slip fit into the cavity 40. Then, the compression screw 34 is threaded into the rearward end 21 of the cutting tool 10 to compress the slugs 32, thereby increasing the stiffness of the cutting tool 10.

To assemble the stiffening device 30 shown in FIG. 5, the plurality of grooved slugs 32' are slip fit into the cavity 40. Then, the compression screw 34' is threaded into the rearward end 21 of the cutting tool 10 to compress the slugs 32', thereby increasing the stiffness of the cutting tool 10.

The patents and publications referred to herein are hereby incorporated by reference.

Having described presently preferred embodiments the invention may be otherwise embodied within the scope of the appended claims.

What is claimed is:

1. A rotary cutting tool, comprising:
   a cutter body having a forward end and a rearward end, the cutter body including a head, a shank, and a cavity extending from the rearward end toward the forward end along a central, longitudinal axis of the cutter body, the cavity having threads at one end thereof, the head including at least one cutting insert mounted in a pocket adjacent to at least one chip groove; and
   a stiffening device including:
      a first compression screw threaded into the rearward end, and
      a plurality of cylindrical slugs with high compressive strength disposed within the cavity,
      wherein the plurality of cylindrical slugs are of uniform diameter and are slip-fitted into the cavity,
   wherein the plurality of cylindrical slugs collectively define a first end of the plurality of cylindrical slugs and a second end of the plurality of cylindrical slugs,
   wherein the first end of the plurality of cylindrical slugs engages an end wall of the cavity and the second end of the plurality of cylindrical slugs engages the first compression screw, and
   wherein, when the first compression screw is threaded into the rearward end of the cutting tool, lateral movement of the plurality of slugs within the cavity is prevented and the stiffening device increases the stiffness of the cutting tool via:
      compressing the plurality of slugs; and
      thereby tensioning the cutter body.

2. The rotary cutting tool according to claim 1, wherein each slug includes a coolant hole longitudinally extending therethrough, a plurality of circumferential grooves on an outer diameter thereof, a plurality of axial grooves on the outer diameter thereof, and a plurality of radial grooves on each end thereof, and wherein the first compression screw has a coolant hole longitudinally extending therethrough.

3. The rotary cutting tool according to claim 1, wherein the first compression screw comprises one end which:
   is non-threaded;
   is cylindrical-shaped so as to have approximately the same diameter as the plurality of slugs; and
   engages the second end of the plurality of slugs.

4. The rotary cutting tool according to claim 3, wherein, when threaded into the rearward end of the cutting tool, the one end of the first compression screw abuts the second end of the plurality of slugs.

5. The rotary cutting tool according to claim 1, wherein the rotary cutting tool comprises a helical end mill.

6. The rotary cutting tool according to claim 1, wherein the at least one chip groove is cut into an exterior surface of the cutter body in a helical or spiral manner.

7. The rotary cutting tool according to claim 1, wherein the plurality of cylindrical slugs are disposed via being stacked within the cavity, wherein each said cylindrical slug directly contacts one or more adjacent cylindrical slugs.

8. A rotary cutting tool, comprising:
   a cutter body having a forward end and a rearward end, the cutter body including a head, a shank, and a cavity extending from the rearward end toward the forward end along a central, longitudinal axis of the cutter body, the cavity having threads at both ends thereof, the head including at least one cutting insert mounted in a pocket adjacent to at least one chip groove; and
   a stiffening device including:
      a first compression screw threaded into the rearward end,
      a second compression screw threaded into the forward end, and
      a plurality of cylindrical slugs with high compressive strength disposed within the cavity between the first compression screw and the second compression screw,
      wherein the plurality of cylindrical slugs are of uniform diameter and are slip-fitted into the cavity,
   wherein the plurality of cylindrical slugs collectively define a first end of the plurality of cylindrical slugs and a second end of the plurality of cylindrical slugs,
   wherein the first end of the plurality of cylindrical slugs engages the second compression screw and the second end of the plurality of cylindrical slugs engages the first compression screw, and
   wherein, when the first compression screw is threaded into the rearward end of the cutting tool and the second compression screw is threaded into the forward end of the cutting tool, lateral movement of the plurality of slugs within the cavity is prevented and the stiffening device increases the stiffness of the cutting tool via:
      compressing the plurality of slugs; and
      thereby tensioning the cutter body.

9. The rotary cutting tool according to claim 8, wherein each slug includes a coolant hole longitudinally extending therethrough, a plurality of circumferential grooves on an outer diameter thereof, a plurality of axial grooves on the outer diameter thereof, and a plurality of radial grooves on each end thereof, and wherein the first compression screw has a coolant hole longitudinally extending therethrough.

10. The rotary cutting tool according to claim 8, wherein the first compression screw comprises one end which:

is non-threaded;
is cylindrical-shaped so as to have approximately the same diameter as the plurality of slugs; and
engages the second end of the plurality of slugs.

11. The rotary cutting tool according to claim 8, wherein the second compression screw comprises one end which:
is non-threaded;
is cylindrical-shaped so as to have approximately the same diameter as the plurality of slugs; and
engages the first end of the plurality of slugs.

12. The rotary cutting tool according to claim 11, wherein, when threaded into the forward end of the cutting tool, the one end of the second compression screw abuts the first end of the plurality of slugs.

13. The rotary cutting tool according to claim 8, wherein the rotary cutting tool comprises a helical end mill.

14. The rotary cutting tool according to claim 8, wherein the at least one chip groove is cut into an exterior surface of the cutter body in a helical or spiral manner.

15. A rotary cutting tool, comprising:
a cutter body having a forward end, a rearward end, the cutter body including a head, a shank, and a cavity extending from the rearward end toward the forward end along a central, longitudinal axis of the cutter body, the cavity having threads at one end thereof, the head including at least one cutting insert mounted in a pocket adjacent to at least one chip groove; and
a stiffening device including a first compression screw threaded into the rearward end and a plurality of cylindrical slugs with high compressive strength disposed within the cavity,
wherein each slug includes a coolant hole longitudinally extending therethrough, a plurality of circumferential grooves on an outer diameter thereof, a plurality of axial grooves on the outer diameter thereof, and a plurality of radial grooves on each end thereof, and wherein the first compression screw has a coolant hole longitudinally extending therethrough, and
wherein the stiffening device increasing the stiffness of the cutting tool when the first compression screw is threaded into the rearward end of the cutting tool.

16. The rotary cutting tool according to claim 15, wherein the plurality of cylindrical slugs engage an end wall of the cavity and the other end of the plurality of cylindrical slugs engage the first compression screw.

17. The rotary cutting tool according to claim 15, further comprising a second compression screw threaded into the forward end of the cutter body.

18. The rotary cutting tool according to claim 15, wherein the plurality of slugs are cylindrical-shaped, and wherein one end of the first compression screw is non-threaded and cylindrical-shaped so as to have approximately the same diameter as the plurality of slugs.

19. The rotary cutting tool according to claim 15, wherein the rotary cutting tool comprises a helical end mill.

20. The rotary cutting tool according to claim 15, wherein the at least one chip groove is cut into an exterior surface of the cutter body in a helical or spiral manner.

* * * * *